Aug. 24, 1943.  E. E. HILKER  2,327,425
VALVE OPERATING MECHANISM
Filed July 1, 1942  8 Sheets-Sheet 1

Inventor
E. E. HILKER
By Malcolm F. Gannon
Attorney

Aug. 24, 1943.   E. E. HILKER   2,327,425
VALVE OPERATING MECHANISM
Filed July 1, 1942   8 Sheets-Sheet 3

Inventor
E. E. HILKER
By Malcolm F. Gannon
Attorney

Aug. 24, 1943. E. E. HILKER 2,327,425
VALVE OPERATING MECHANISM
Filed July 1, 1942 8 Sheets-Sheet 8
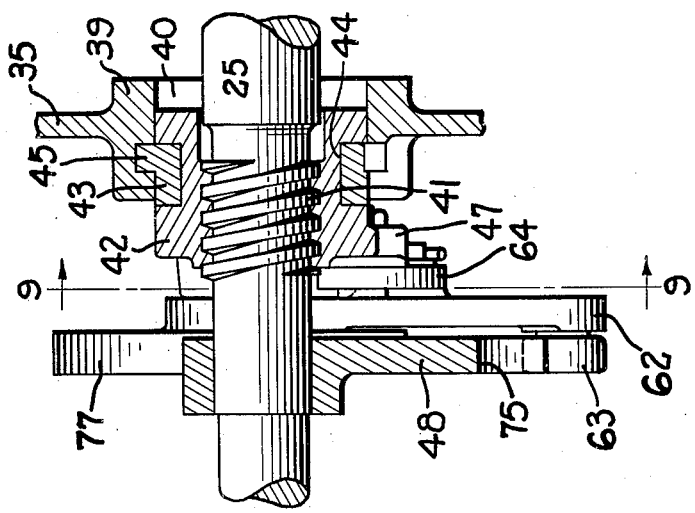
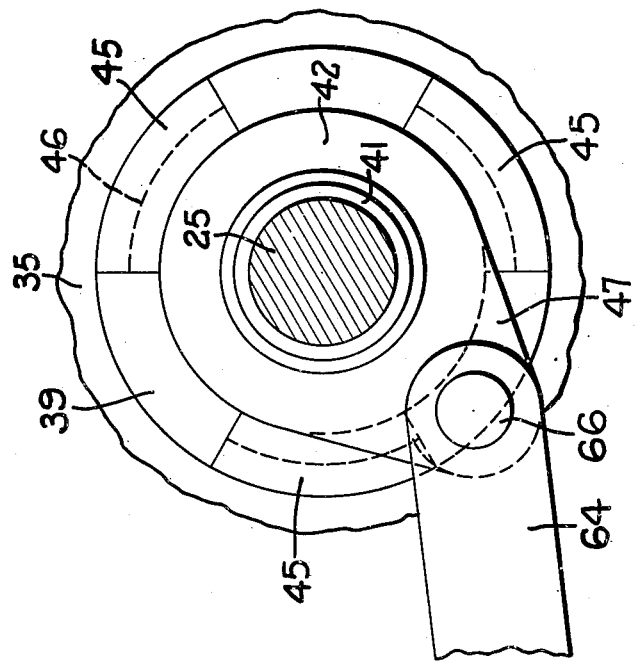
Inventor
E. E. HILKER
By Malcolm F. Gannon
Attorney Patented Aug. 24, 1943

2,327,425

UNITED STATES PATENT OFFICE 2,327,425

VALVE OPERATING MECHANISM

Earl E. Hilker, Spring Garden Township, York County, Pa., assignor to S. Morgan Smith Company, York, Pa., a corporation of Pennsylvania Application July 1, 1942, Serial No. 449,245

9 Claims. (Cl. 74—22)

This invention relates to valves, and more particularly to the mechanism for operating valves.

An object of the invention is to provide an improved valve operating mechanism in which a conical plug member is reciprocable between the wedged and unwedged position and is rotatable between open and closed position.

Another object of the invention is to provide an improved valve operating mechanism having rotatable means for actuating the means for reciprocating the plug between wedged and unwedged positions and for rotating the plug in its unwedged position.

Another object of the invention is to provide an improved valve operating mechanism which is characterized by its novelty, simplicity and efficiency under all conditions of service.

Another object of the invention is to provide an improved valve structure which includes a rotatable plug having a shaft with means operatively associated therewith and including a rotatable operating member for operating the mechanism in such a manner that the valve plug is first moved axially to unwedge the same, then rotated to its open or closed position, and then moved axially to rewedge the same.

Another object of the invention is to provide an improved means for imparting rotary and axial movements to a member having a shaft formed with a threaded portion, in which a nut is mounted on the threaded portion of the shaft for moving the shaft and said member axially when the nut is rotated, and in which the operating means includes a second shaft arranged in parallel relationship in spaced relation to the first shaft and having a crank fixed thereto and operatively connected to the nut to turn the nut therewith, the operating means including a rotator fixed to the first shaft and having a radially disposed slot formed therein to receive a roller carried by the crank so that the rotator is turned by the crank and thereby rotates the member, and means also carried by the crank and engageable with the rotator when the roller is disengaged from the slot to hold the rotator against rotation.

With the foregoing and other objects and advantages in view, the invention consists in the preferred construction and arrangement of the several parts which will be hereinafter fully described and claimed.

In the accompanying drawings:

Fig. 8 is an enlarged section of a portion of the operating mechanism shown in Fig. 1; and Fig. 9 is a section taken on the line 9—9 of Fig. 8.

Figure 1:
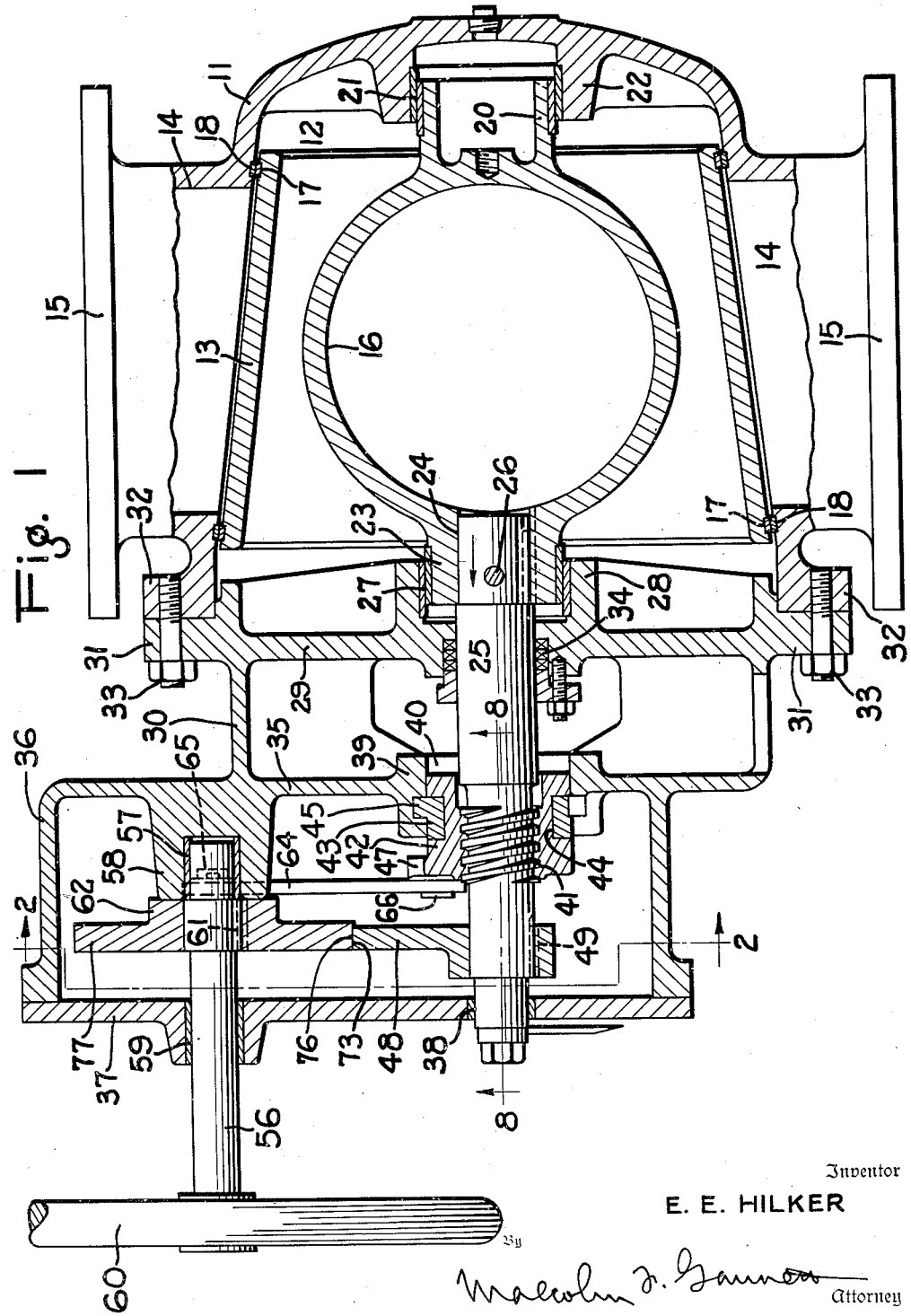
Fig. 1 is a horizontal section through a tapered plug valve embodying the present invention, the plug being shown in closed position.

Referring to the drawings, the improved valve comprises a main body or casing 11 having a cavity 12 formed therein for a tapered plug 13, the cavity being intersected by a longitudinal waterway or opening 14 which constitutes a passage through the valve. The portion of the casing 11 in which the waterway 14 is formed may terminate in flanges 15, by which the valve can be connected to the ends of pipes or conduits in well known manner.

The plug 13 has a passage 16 formed therein, so that when the plug is in the open position (see Figs. 6 and 7), a bore will extend through the valve from end to end.

The plug 13 may have seat rings 17 which are adapted to engage seat rings 18 mounted in the body 11 so as to provide a seal between the plug and the valve body when the plug is in seated position.

The plug 13 is supported for both axial and rotary movement in the valve body 11. At its inner or smaller end the plug 13 is formed with an extension in the nature of a trunnion 20 which is adapted to be disposed in a bore 21 formed in a tubular extension 22 projecting inwardly from the smaller end of the valve body.

At its outer or larger end, the plug 13 has an extension 23 formed with a bore 24 in which is mounted one end of a shaft 25 of the valve operating mechanism. The shaft 25 may be connected to the plug 13 by means of a pin 26.

The extension 23, which constitutes a trunnion, is mounted in an opening 27 formed in a boss 28 depending from the underside of a cover plate or web 29, which closes the larger end of the valve body.

The cover plate or web 29 may be part of a housing 30 of the valve mechanism, and is formed with a peripheral flange 31 for engaging a correspondingly formed flange 32 of the valve body 11, so that the housing 30 can be detachably secured to said valve body by means of bolts or other securing elements 33.

Suitable bushings are mounted on the trunnions 20 and 23 and in the openings 21 and 27, respectively, to permit free movement of the plug 13 with respect to its casing (see Fig. 1).

The joint between the valve shaft 25 and the wall 29 is sealed by means of a packing gland 34.

Figure 2:
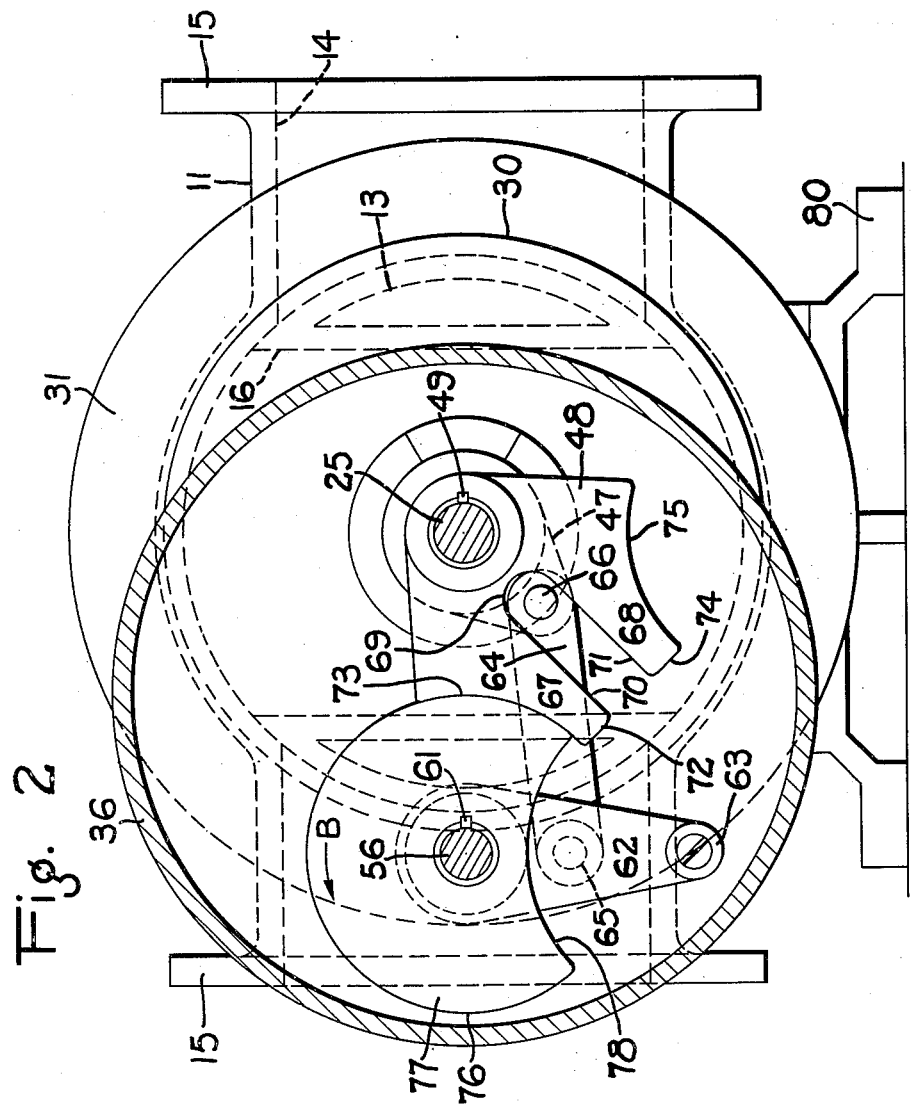
Fig. 2 is a section taken on the line 2—2 of Fig. 1, showing the operating mechanism in valve plug closed position.

The portion of the housing indicated by the numeral 30 may be concentric with the longitudinal axis of the valve shaft 25, as shown in Figs. 1 and 2.

At the outer end of the concentric portion 30 of the housing, there is a second wall or web 35 from which extends outwardly a second section 36 of the housing, said second section having an annular wall eccentrically disposed with respect to the portion 30 of the housing.

A cover plate 37 is attached to the housing section 36 and the plug shaft 25 extends outwardly through an opening 38 formed in said cover plate.

The wall 35 is formed with a boss 39 having an opening 40 therein.

The valve shaft 25 is formed with screw threads 41 of suitable pitch.

Mounted on the threaded portion 41 of the shaft 25 is a lift nut 42 having internal screw threads engaging the screw threads 41, as shown in Figs. 1 and 8.

The lift nut 42 is held in position in the boss 39, so that said nut cannot move lengthwise or axially of the shaft 25, by means of a collar 43.

Preferably the collar 43 is made in sections so that said collar can be assembled in a groove 44 formed in the lift nut 42, the sections of said collar having a peripheral flange 45 disposed in an annular groove 46 formed in the boss 39.

As shown best in Fig. 9, the lift nut 42 has an extension formed thereon which constitutes a crank 47.

Mounted on the plug shaft 25 in spaced relation to the screw threaded portion 41, is a second crank 48, which is keyed to said shaft, as indicated at 49. The purpose of the crank 48 is to turn the shaft 25 so that the plug 13 is rotated from closed to open position and vice versa, and therefore said crank 48 will hereinafter be referred to as the rotator.

In the present embodiment of the invention the plug 13 is adapted to be turned through an angle of approximately 90 degrees from closed to open position and vice versa. The valve operating mechanism is adapted to be actuated in order to first unseat the plug, then turn the plug, and finally reseat the plug.

Disposed laterally with respect to the plug shaft 25 and arranged in parallel relationship to the longitudinal center line of said shaft, is an operating shaft 56.

The shaft 56 is supported for rotary movement in the housing 36, having one end mounted in a bore 57 formed in a boss 58 of said housing. The shaft 56 extends outwardly through an opening 59 formed in the cover plate 37. The outer extremity of the shaft 56 may have a hand wheel 60 mounted thereon, or if so desired suitable power mechanism (not shown) may be operatively connected to said shaft for the purpose of operating the same.

Mounted on the shaft 56 and connected thereto by means of a key 61, is a crank 62, carrying at its outer end a roller 63, the purpose of which will be hereinafter described (see Fig. 2).

The intermediate portion of the crank 62 is connected to the end of the crank 47 by a link or rod 64, one end of the rod 64 being pivotally connected to the arm of the crank 62 by a pin 65, and the other end of said rod being pivotally connected to the crank 47, by a pin 66.

The arrangement of the parts is such that the distance between the centers of the pins 65 and 66 is less than the distance between the centers of the shafts 56 and 25, respectively, as shown in Fig. 2.

The rotator 48 is formed with two arms 67 and 68, between which is a slot 69.

The slot 69 is formed with two side walls 70 and 71 which are spaced apart in parallel relationship a distance sufficient to receive between them the roller 63 of the actuator crank 62. The slot 69 has a length to permit movement therein of the roller 63 in the manner to be hereinafter described.

When the valve plug 13 is seated in closed position, as shown in Fig. 2, the longitudinal center of the slot 69 coincides substantially with the longitudinal center of the crank 47.

The arm 67 of the rotator 48 is formed with an outer end wall 72 and an arcuate side wall 73.

The arm 68 is likewise formed with an outer end wall 74 and an arcuate side wall 75.

The arcuate side walls 73 and 75 provide a pair of concave recesses on the periphery of the rotator 48, either one of which recesses is adapted to be engaged by a perimetral portion 76 of a disklike portion 77 of the actuator crank 62, so as to lock the rotator 48 against turning during axial movement of the plug shaft 25.

The curved portion 76 is concentric with the axis of rotation of the shaft 56, said curved portion preferably having a radius less than the length of the crank 62. The radius of the arcuate side walls 73 and 75 of the rotator 48 corresponds substantially to the radius of the portion 76 of the member 77, so that when the shaft 56 is turned the surface 76 contacting with either the surface 73 of the surface 75 will slide freely. The length of the curved surface 76 should preferably be more than one-half the perimeter of the member 77, however, said curved surface is somewhat less than the complete circumference of said member 77 and connecting one end of the surface 76 with the other end thereof, is an arcuate surface defining a concave recess 78. The center of curvature of the recess 78 may be if desired the center of the axis of the roller 63, and said recess extends equidistantly in opposite directions from the center line of the crank 62 passing through the shaft 56 and the roller 63.

As shown in Fig. 2, the lug shaft 25 may be disposed in a horizontal position, in which position the valve body is supported by means of a suitable base 80. When the valve is so disposed, the longitudinal center line of the waterway 16 of the plug 13 will be vertical when said plug is in closed position. In order to turn the plug 13 towards open position, in which the waterway 16 registers with the waterway 14, the shaft 25 is turned in the clockwise direction of the arrow A in Figs. 3, 4, 5 and 6.

In operation, when it is desired to open the valve, the hand wheel 60 is turned in the direction to rotate the shaft 56 and the actuator 62, 77, in the counterclockwise direction indicated by the arrow B, Fig. 2.

When the valve plug 13 is in closed and seated position (Fig. 2) the roller 63 is disposed a considerable distance from the mouth of the slot 69, consequently, during the first portion of the turning movement of the shaft 56, the actuator 62, through the link or rod 64, moves the crank 47 of the lift nut 42 in the direction from left to right so as to impart a counterclockwise movement to the lift nut 42. During this swinging movement of the cranks 47 and 62 towards the right (Fig. 2) the roller 63 is brought closer towards the mouth of the slot 69. Since the rotator 48 is interclocked with the member 77 of the actuator 62, by the engagement of the perimetral portion 76 with the recess 73, the rotator 48 is held in position and cannot move. Hence, no rotation of the plug shaft 25 takes place during the initial period of operation of the valve operating mechanism. However, the actuator 62, through the link 64, turns the crank 47 through an angle of approximately 45 degrees so that the lift nut 42 is turned on the valve shaft 25 in such a manner that said shaft and the plug 13 are moved axially in the direction of the arrow, Fig. 1, whereby the plug is unwedged or unseated from the seat rings 18. This lifting or unwedging action occurs during the first part of the rotation given the shaft 56 in the direction of the arrow B, Fig. 2, and reverses during the latter period of the operation of said shaft, during which latter operation the plug 13 is returned approximately to its initial axial position.

Figure 3:
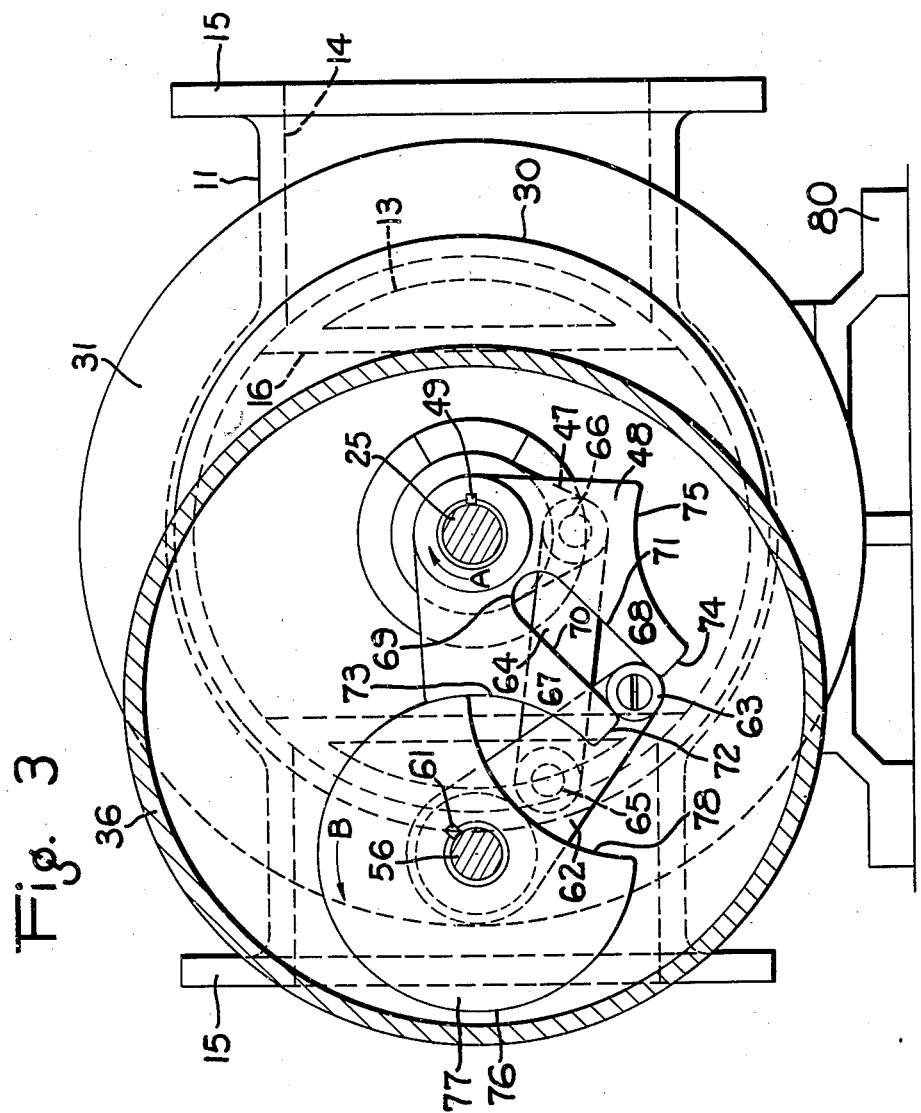
Figs. 3, 4, 5, 6 and 7 are views similar to Fig. 2, showing the operating mechanism in various positions.
Figure 4:
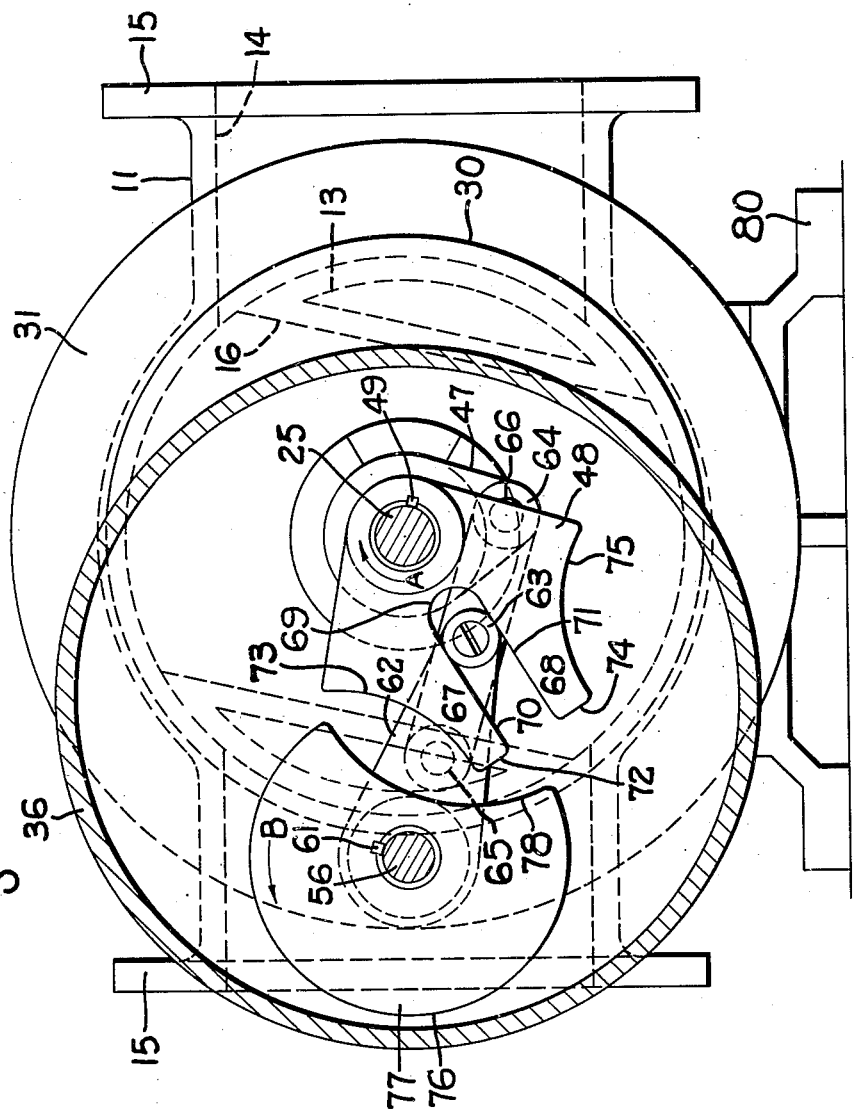
Figure 5:
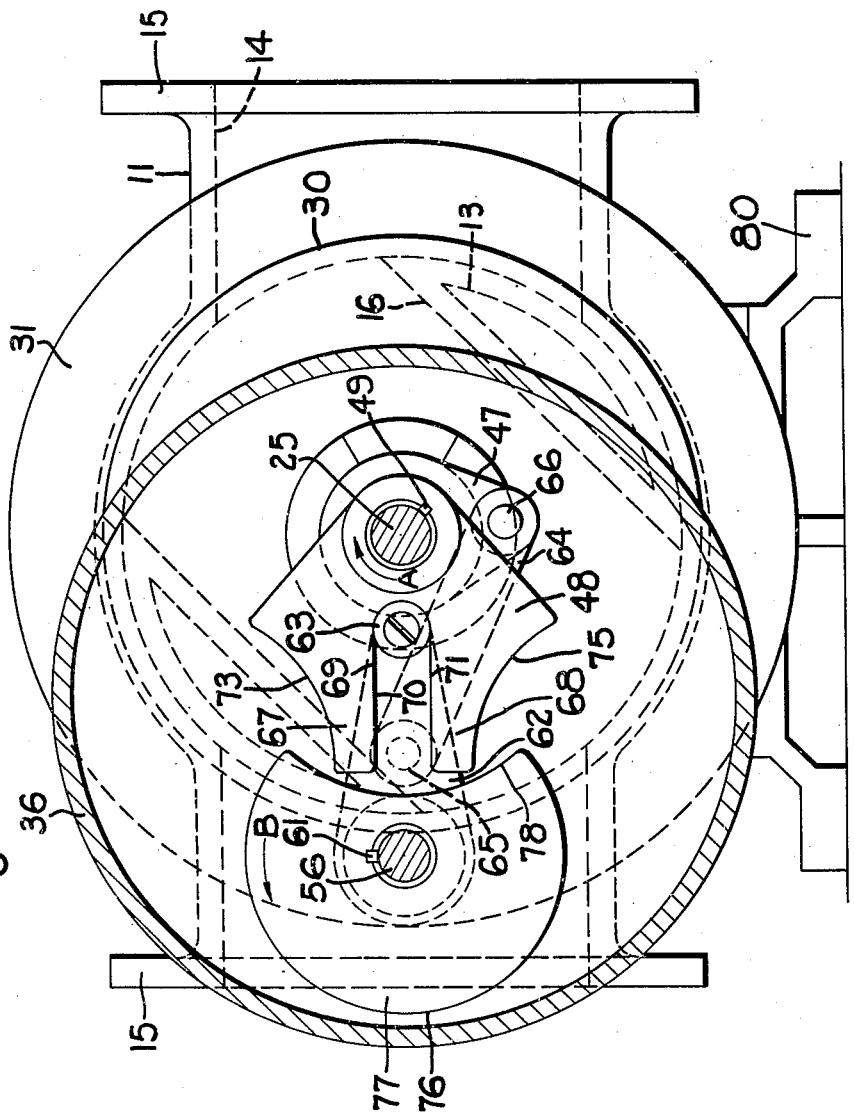

During the rotation of the shaft 56, the roller 63 is carried by the crank 62 into the mouth of the slot 69, as shown by Fig. 3, and immediately after said roller enters the mouth of the slot 69, the end of the perimetral surface 76 of the member 77 becomes disengaged from the surface of the recess 73, so that the rotator is unlocked from the member 77.

Due to the counterclockwise direction in which the crank 62 is turned when the roller 63 enters the slot 69, said roller bears against the side wall 70 of said slot and forces the rotator 48 to turn the shaft 25 in a clockwise direction. Continued rotation of the crank 62 moves the roller 63 first inwardly and then outwardly of the slot 69, thereby rotating the plug 13 through the desired angle from closed to open position. When the roller 63 moves outwardly towards the mouth of the slot 69, the perimetral portion 76 of the member 77 moves into engagement with the recess 75 of the rotator 48, so that when the roller 63 emerges from the slot 69 the rotator 48 is interlocked with the member 77 of the actuator 62 and consequently the rotator 48 and the valve plug 13 are held in position and cannot move. When the roller 63 emerges from the slot 69 the lift nut 42 has moved the shaft 25 and the plug 13 axially in the direction towards the seating-position of the plug and the final movement of the crank 62 rewedges the plug 13. The reverse of all this action takes place with the movement of the actuator 62 in a clockwise direction to close the valve.

During rotation of the crank 62 and the shaft 25, crank 47 is also turned. First, during the travel of the roller 63 inwardly of the slot 69, the crank 47 swings further in a counterclockwise direction, as will be noted by comparing the position of the parts shown in Fig. 3 with the position of the same parts in Fig. 4. Second, when the roller 63 is at the inner end of the slot 69, the crank 47 commences to swing towards the left or in a clockwise direction, and during the movement of the roller 63 outwardly of the slot 69, the crank 47 swings backwardly in a clockwise direction so that when the roller 63 emerges from the slot 69 the lift nut 42 has been turned by the crank 47 through an angle sufficient to move the shaft 25 and the plug 13 axially in the direction to reseat the plug 13. The final movement of the crank 62 rewedges the plug.

Figure 6:
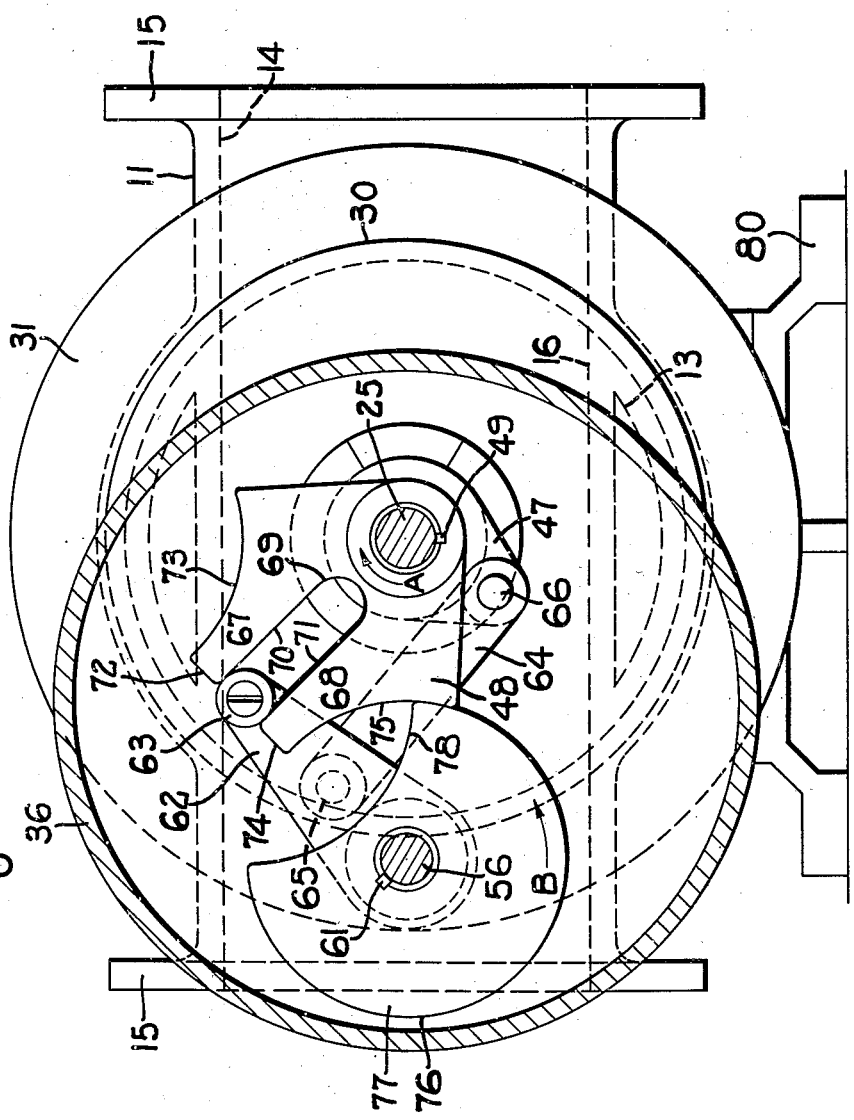
Figure 7:
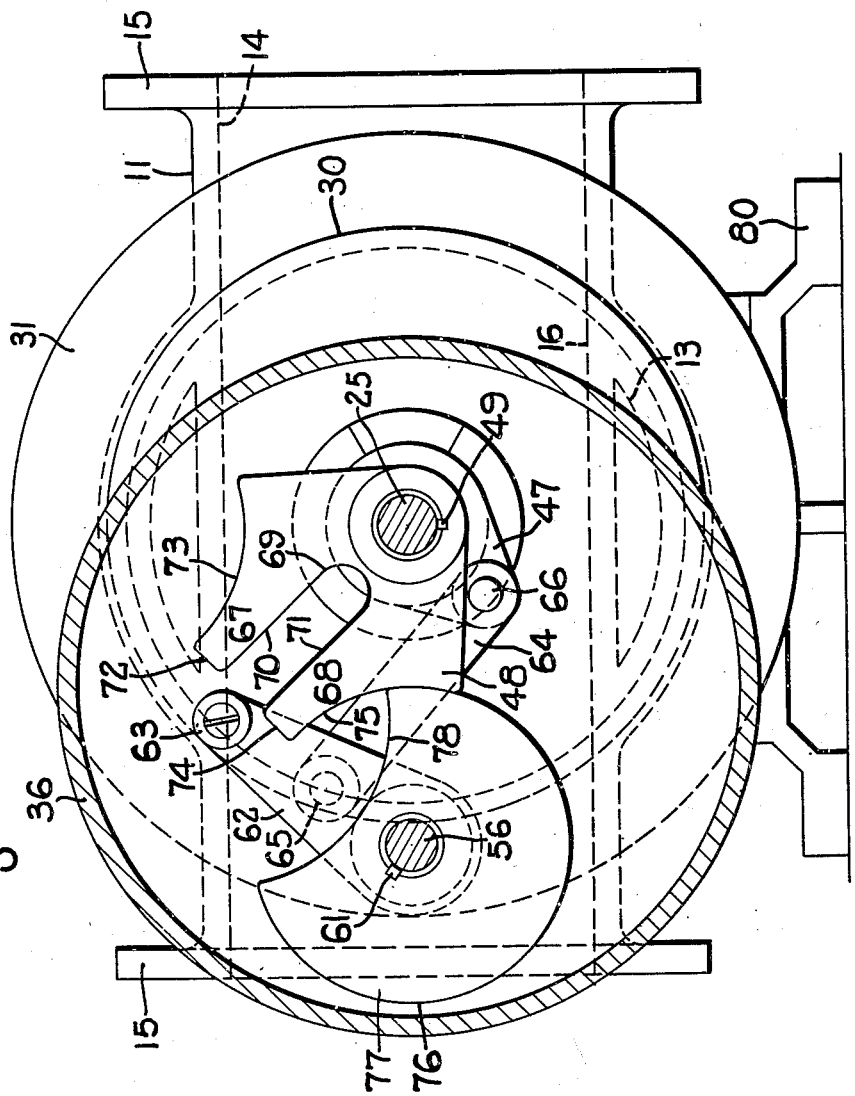

Thus, it will be noted that during the operation of the mechanism to turn the plug 13 from closed to open position, during the first portion of the operation of the mechanism, the crank 62 imparts a movement to the crank 47 which results in the lift nut 42 moving the shaft 25 and the plug 13 axially in a direction to unwedge the plug. The plug is then turned through the desired angle (90 degrees) towards open position and at the same time the crank 47 is operated by the crank 62 to impart a follow up movement to the lift nut 42 to thereby maintain the plug 13 unseated while said plug is being rotated. However, at a period in the operation of the shaft 56 before the complete rotation of the plug 13 is effected, the crank 62 has moved the crank 47 in the direction in which the lift nut 42 has imparted a partial axial movement to the shaft 25 so that the plug 13 is moving axially towards its seat in the valve body 11 when the turning movement of said valve plug is completed, as shown in Fig. 6. It thus only requires a very small movement of the crank 62 after the plug 13 has been turned to wide open position in order to rewedge the plug in its seat (see Fig. 7). The reverse of all this action takes place with the rotation of the hand wheel 60 in the direction to close the valve.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described my invention, what I claim is:

1. In means for imparting rectilinear and rotary movements to a member having a shaft provided with a threaded portion, a nut having an internal threaded portion mounted on the threaded portion of said shaft for moving said shaft and said member rectilinearly when the nut is rotated, a second shaft, means for rotating the second shaft, a crank fixed to said nut, a second crank fixed to said second shaft, a link connecting both of said cranks whereby when the second crank is turned said nut will be turned, a rotator fixed to said first shaft, a radially disposed slot formed in said rotator and extending inwardly from the outer edge of the rotator body, a roller mounted on said second crank and adapted to enter the slot of said rotator after the second crank has been turned through a predetermined angle whereby said rotator is turned by said crank and thereby rotates said member, said roller being adapted to pass out of said slot after the rotator has been turned through the predetermined angle, a disk-like member formed as part of said second crank, the periphery of said disk-like member having a circular portion and a portion in the form of a concave recess extending equidistantly in opposite directions from the longitudinal center line of said second crank, and arcuate side walls formed in the periphery of said rotator, said side walls being disposed at opposite sides of the longitudinal center line of said rotator slot, the curvature of said arcuate side walls corresponding substantially with the curvature of the circular portion of the periphery of said disk-like member, the circular portion of the periphery of the disk-like member being adapted to engage the arcuate side walls of said rotator during operation of said second crank to hold the rotator against rotation when the roller of said second crank is disengaged from the rotator slot.

2. The combination of a member having a shaft with operating means therefor comprising, a screw thread formed on a portion of said shaft, a nut having an internal threaded portion mounted on the threaded portion of said shaft for moving said shaft and said member axially when the nut is rotated, means for retaining said nut against axial movement with respect to the shaft, a second shaft arranged in parallel relationship in spaced relation to said first shaft, a crank projecting from said nut, a second crank fixedly mounted on said second shaft, a link pivotally connecting said cranks whereby rotation of the second crank operates the first crank to rotate the nut to effect an axial movement of said first shaft, a rotator fixedly mounted on said first shaft and having a radially disposed slot formed therein to receive a roller carried by said second crank whereby said rotator is turned by said second crank, a disk-like member formed as part of said second crank, the periphery of said disk-like member having a circular portion and a portion in the form of a concave recess extending equidistantly in opposite directions from the longitudinal center line of the second crank, and means formed on the periphery of said rotator at opposite sides of the longitudinal center line of said slot and engageable by the circular peripheral portion of said disk-like member to hold the rotator against rotation when the roller on said second crank is disengaged from said slot.

3. In means for imparting rectilinear and rotary movements to a member having a shaft provided with a threaded portion, a nut having an internal threaded portion mounted on the threaded portion of said shaft for moving said shaft and said member rectilinearly when the nut is rotated, a power shaft, means for rotating said power shaft, a crank fixed to said nut, an actuator crank fixed to said power shaft, a rod connecting the intermediate portion of said acutator crank to the crank of said nut whereby rotation of said actuator shaft is imparted to said nut, a rotator fixed to said first shaft, a radially disposed slot formed in said rotator and extending inwardly from the outer edge of said rotator body, a roller mounted on the end portion of said actuator crank and disposed in spaced relation to the mouth of said rotator slot when said member is in certain positions, said roller being adapted to enter the slot of said rotator when the actuator crank has been turned through a predetermined angle to thereby engage a side wall of said slot and turn said rotator and said first shaft through a predetermined angle as the roller moves first inwardly and then outwardly of said slot, said roller being adapted to pass out of said slot after the rotator has been turned through the predetermined angle.

4. In means for imparting rectilinear and rotary movements to a member having a shaft provided with a threaded portion, a nut having an internal threaded portion mounted on the threaded portion of said shaft for moving said shaft and said member rectilinearly when the nut is rotated, a power shaft, means for rotating said power shaft, a crank fixed to said nut, an actuator crank fixed to said power shaft, a rod connecting the intermediate portion of said actuator crank to the crank of said nut whereby rotation of said actuator shaft is imparted to said nut, a rotator fixed to said first shaft, a radially disposed slot formed in said rotator and extending inwardly from the outer edge of said rotator body, a roller mounted on the end portion of said actuator crank and disposed in spaced relation to the mouth of said rotator slot when said member is in certain positions, said roller being adapted to enter the slot of said rotator when the actuator crank has been turned through a predetermined angle to thereby engage a side wall of said slot and turn said rotator and said first shaft through a predetermined angle as the roller moves first inwardly and then outwardly of said slot, said roller being adapted to pass out of said slot after the rotator has been turned through the predetermined angle, and means for locking said rotator in position to prevent rotation thereof when the roller is out of engagement with said slot.

5. In means for imparting rectilinear and rotary movements to a member having a shaft provided with a threaded portion, a nut having an internal threaded portion mounted on the threaded portion of said shaft for moving said shaft and said member rectilinearly when the nut is rotated, a power shaft, means for rotating said power shaft, a crank fixed to said nut, an actuator crank fixed to said power shaft, a rod connecting the intermediate portion of said actuator crank to the crank of said nut whereby rotation of said actuator shaft is imparted to said nut, a rotator fixed to said first shaft, a radially disposed slot formed in said rotator and extending inwardly from the outer edge of said rotator body, a roller mounted on the end portion of said actuator crank and disposed in spaced relation to the mouth of said rotator slot when said member is in certain positions, said roller being adapted to enter the slot of said rotator when the actuator crank has been turned through a predetermined angle to thereby engage a side wall of said slot and turn said rotator and said first shaft through a predetermined angle as the roller moves first inwardly and then outwardly of said slot, said roller being adapted to pass out of said slot after the rotator has been turned through the predetermined angle, and means carried by said operating shaft and engaging means formed on said rotator for locking said rotator in position to prevent rotation thereof when the roller is out of engagement with said slot.

6. In means for imparting rectilinear and rotary movements to a member having a shaft provided with a threaded portion, a nut having an internal threaded portion mounted on the threaded portion of said shaft for moving said shaft and said member rectilinearly when the nut is rotated, a power shaft, means for rotating said power shaft, a crank fixed to said nut, an actuator crank fixed to said power shaft, a rod connecting the intermediate portion of said actuator crank to the crank of said nut whereby rotation of said actuator shaft is imparted to said nut, a rotator fixed to said first shaft, a radially disposed slot formed in said rotator and extending inwardly from the outer edge of said rotator body, a roller mounted on the end portion of said actuator crank and disposed in spaced relation to the mouth of said rotator slot when said member is in certain positions, said roller being adapted to enter the slot of said rotator when the actuator crank has been turned through a predetermined angle to thereby engage a side wall of said slot and turn said rotator and said first shaft through a predetermined angle as the roller moves first inwardly and then outwardly of said slot, said roller being adapted to pass out of said slot after the rotator has been turned through the predetermined angle, a disk-like member formed as part of said actuator crank, the periphery of said disk-like member having a circular portion and a portion in the form of a concave recess extending equidistantly in opposite directions from the longitudinal center line of said second crank, and arcuate side walls formed in the periphery of said rotator, said side walls being disposed at opposite sides of the longitudinal center line of said rotator slot, the curvature of said arcuate side walls corresponding substantially to the curvature of the circular portion of the periphery of said disk-like member, the circular portion of the periphery of the disk-like member being adapted to engage with the arcuate side walls of said rotator during operation of said actuator crank to hold the rotator against rotation when the roller of said actuator crank is disengaged from the rotator slot.

7. In means for imparting rectilinear and rotary movements to a member having a shaft provided with a threaded portion, a nut having an internal threaded portion mounted on the threaded portion of said shaft for moving said shaft and said member rectilinearly when the nut is rotated, a power shaft, a crank fixed to said nut, an actuator crank fixed to said power shaft, a rod connecting said actuator crank to the crank of said nut whereby rotation of said power shaft is imparted to said nut, a rotator fixed to said member shaft, a slot formed in said rotator and extending inwardly from the outer edge of said rotator body, a roller mounted on said actuator crank and disposed in spaced relation to the mouth of said rotator slot when said member is in certain positions, said roller being adapted to enter the slot of said rotator when the actuator crank has been turned through a predetermined angle to thereby engage a side wall of said slot and turn said rotator and said member shaft through a predetermined angle as the roller moves first inwardly and then outwardly of said slot, said roller being adapted to pass out of said slot after the rotator has been turned through the predetermined angle.

8. In means for operating a member having a shaft, a power shaft, a crank fixed to said power shaft, a rotator fixed to said first shaft, a slot formed in said rotator and extending inwardly from the outer edge of said rotator body, a roller mounted on said crank and disposed in spaced relation to the mouth of said rotator slot when said member is in certain positions, said roller being adapted to enter the slot of said rotator when said crank has been turned through a predetermined angle to thereby engage a side wall of said slot and turn said rotator and said member shaft through a predetermined angle as the roller moves first inwardly and then outwardly of said slot, said roller being adapted to pass out of said slot after the rotator has been turned through the predetermined angle.

9. In means for operating a member having a shaft, a power shaft, a crank fixed to said power shaft, a rotator fixed to said first shaft, a slot formed in said rotator and extending inwardly from the outer edge of said rotator body, a roller mounted on said crank and disposed in spaced relation to the mouth of said rotator slot when said member is in certain positions, said roller being adapted to enter the slot of said rotator when said crank has been turned through a predetermined angle to thereby engage a side wall of said slot and turn said rotator and said member shaft through a predetermined angle as the roller moves first inwardly and then outwardly of said slot, said roller being adapted to pass out of said slot after the rotator has been turned through the predetermined angle, a disk-like member formed as a part of said crank, the periphery of said disk-like member having a circular portion and a portion in the form of a concave recess extending equidistantly in opposite directions from the longitudinal center line of said crank, and arcuate side walls formed in the periphery of said rotator, said side walls being disposed at opposite sides of the center of the mouth of said slot, the curvature of said arcuate side walls corresponding substantially with the curvature of the circular portion of the periphery of said disk-like member, the circular portion of the periphery of the disk-like member being adapted to engage the arcuate side walls of said rotator during operation of said crank to hold the rotator against rotation when the roller is disengaged from the rotator slot.

EARL E. HILKER.